US009435384B2

(12) United States Patent
Bünder et al.

(10) Patent No.: US 9,435,384 B2
(45) Date of Patent: Sep. 6, 2016

(54) ACTUATOR ARRANGEMENT FOR A MOTOR VEHICLE TRAIN

(71) Applicant: GETRAG Getriebe- und Zahnradfabrik Hermann Hagenmeyer GmbH & Cie KG, Untergruppenbach (DE)

(72) Inventors: Carsten Bünder, Stuttgart (DE); Stefan Rothvoss, Steinheim (DE)

(73) Assignee: GETRAG GETRIEBE—UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 52 days.

(21) Appl. No.: 14/459,035

(22) Filed: Aug. 13, 2014

(65) Prior Publication Data
US 2014/0346002 A1 Nov. 27, 2014

Related U.S. Application Data

(63) Continuation of application No. PCT/EP2013/052714, filed on Feb. 12, 2013.

(30) Foreign Application Priority Data

Feb. 14, 2012 (DE) .................. 10 2012 003 415

(51) Int. Cl.
*B60K 17/12* (2006.01)
*B60K 17/10* (2006.01)
(Continued)

(52) U.S. Cl.
CPC .............. *F16D 27/14* (2013.01); *F16H 61/688* (2013.01); *F16H 63/18* (2013.01); *F16H 61/32* (2013.01); *F16H 2061/2869* (2013.01)

(58) Field of Classification Search
CPC .............. F16H 2061/2823; F16H 2061/2853; F16H 61/705

USPC .............. 74/330, 335, 473.1, 473.11, 473.12
See application file for complete search history.

(56) References Cited

U.S. PATENT DOCUMENTS 5,590,563 A * 1/1997 Kuwahata .............. F16H 61/30
    74/337.5
6,003,649 A * 12/1999 Fischer .................. F16H 61/28
    192/3.58

(Continued)

FOREIGN PATENT DOCUMENTS

CN    101517259 A    8/2009
CN    102052455 A    5/2011

(Continued)

OTHER PUBLICATIONS

International Preliminary Report on Patentability in International Patent Application No. PCT/EP2013/052714, issued Aug. 19, 2014 in 7 pages.

(Continued)

*Primary Examiner* — Ha D Ho
(74) *Attorney, Agent, or Firm* — Knobbe Martens Olson & Bear LLP

(57) ABSTRACT

An actuator arrangement for a motor vehicle drive train which has at least one friction clutch for transmitting drive torque, in particular in the form of a starting clutch, as well as a gearbox having at least two gears, which can be engaged and disengaged by means of a shift clutch arrangement. The actuator arrangement comprises a hydraulic circuit that has a pump driven by means of an electric motor; a clutch hydraulic cylinder by means of which the friction clutch can be actuated; and a shift actuator device for actuating the shift clutch arrangement. The shift actuator device has a shift drum which is or can be coupled to the electric motor via a shift drum coupling device in a manner such that the shift drum can be set in rotation by means of the electric motor in order to actuate the shift clutch arrangement.

19 Claims, 3 Drawing Sheets

(51) Int. Cl.
 *F16D 27/14* (2006.01)
 *F16H 63/18* (2006.01)
 *F16H 61/688* (2006.01)
 *F16H 61/32* (2006.01)
 *F16H 61/28* (2006.01)

(56) References Cited

U.S. PATENT DOCUMENTS

| | | | | |
|---|---|---|---|---|
| 7,631,570 | B2* | 12/2009 | Mizuno | F16H 61/32 74/331 |
| 8,052,574 | B2* | 11/2011 | Suzuki | F16H 61/32 477/98 |
| 8,229,637 | B2* | 7/2012 | Kobayashi | F16H 9/72 701/51 |
| 2009/0255773 | A1 | 10/2009 | Seufert et al. | |
| 2011/0100144 | A1 | 5/2011 | Neelakantan et al. | |
| 2011/0303049 | A1 | 12/2011 | Neelakantan et al. | |

FOREIGN PATENT DOCUMENTS

| | | |
|---|---|---|
| CN | 102278463 A | 12/2011 |
| DE | 10 2008 059267 A1 | 6/2009 |
| EP | 2275719 A1 | 1/2011 |
| JP | S56-22116 A | 3/1981 |
| JP | 2011-214609 A | 10/2011 |

OTHER PUBLICATIONS

International Search Report, PCT/EP2013/052714, Apr. 11, 2013, 2 pages.

Office Action issued Oct. 10, 2015 in CN Application No. 201380019948.5.

* cited by examiner

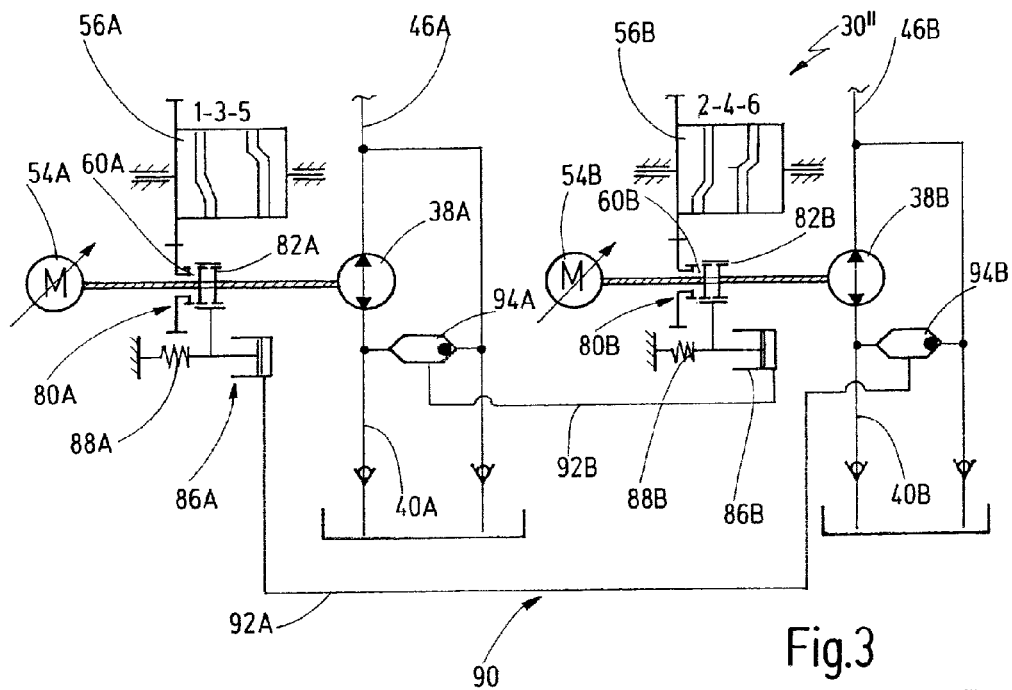
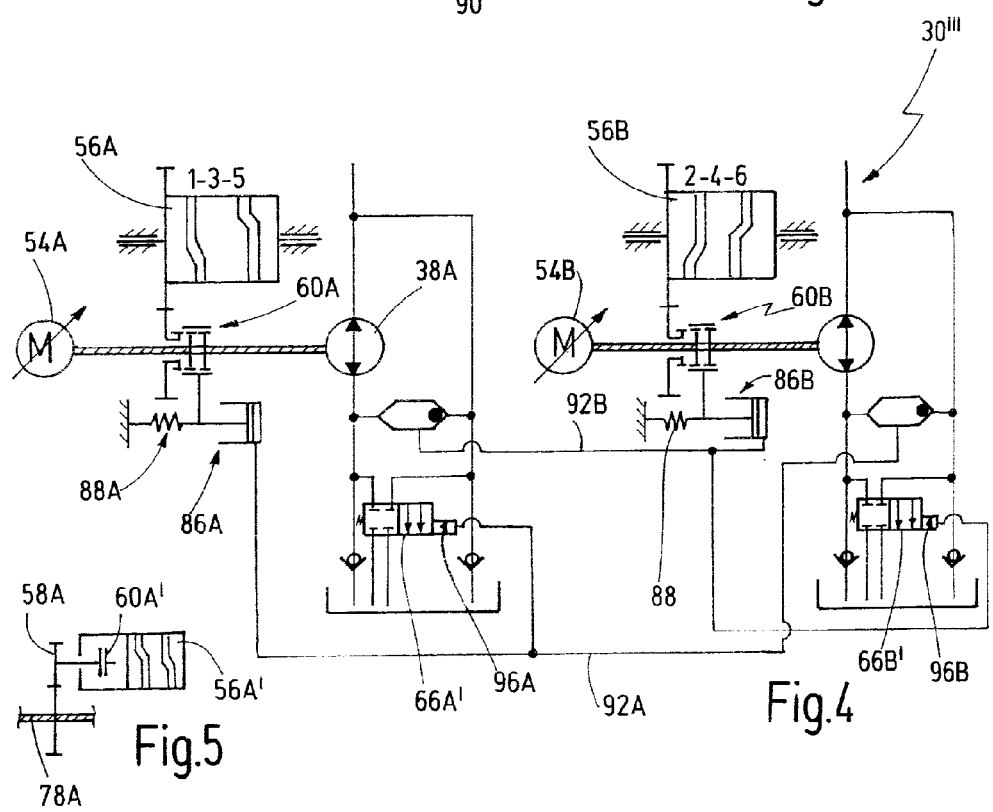

ACTUATOR ARRANGEMENT FOR A MOTOR VEHICLE TRAIN

CROSS-REFERENCES TO RELATED APPLICATIONS

This is a Continuation application of International patent application PCT/EP 2013/052714, filed on Feb. 12, 2013, which claims the priority from German patent application DE 10 2012 003 415.6, filed on Feb. 14, 2012.

BACKGROUND

The present invention concerns an actuator arrangement for a motor vehicle drive train which comprises at least one friction clutch for transmission of a drive torque, in particular in the form of a starting clutch, and a gear mechanism with at least two gears which can be engaged and disengaged by means of a shift clutch arrangement, with a hydraulic circuit having a pump which can be driven by means of an electric motor and having a clutch hydraulic cylinder, by means of which the friction clutch can be actuated, and with a shift actuator device for activating the shift clutch arrangement.

In the field of motor vehicle drive trains, automated gear mechanisms are known such as automated manual gear mechanisms, double clutch gear mechanisms, convertor automatic gear mechanisms etc. Automated gear mechanisms are fitted with suitable actuators both with regard to the clutch actuation and with regard to the shift actuation, so that these processes can proceed automatically.

To actuate the friction clutch, it is known and preferred to use hydraulic actuators, wherein the friction clutch is actuated by means of a clutch hydraulic cylinder. This allows a sensitive and rapid regulation of the torque transmitted via the friction clutch, which is important in particular in double clutch gear mechanisms. This is because here, two friction clutches are actuated in an overlapping manner for torque transmission from one power transmission branch to the other power transmission branch.

It is also known to use hydraulic cylinders as a shift actuator device to actuate individual shift clutch packages such as synchronization mechanisms. The advantage here is that a single fluid source can be used to actuate the friction clutch and to actuate the shift clutch.

It is however also known to actuate the shift clutch arrangement electrically, for example by electromagnetic actuators or electric motors. In the latter case, it is known to use so-called shift drums to actuate shift clutches, which are driven by means of an electric motor.

It is also known to provide shift clutch arrangements with selector shafts which are moved in the shift direction by means of a hydraulic cylinder and in the selection direction by means of an electric motor.

To regulate the pressure of a hydraulic fluid, it is known to use a pump to generate a line pressure which is held constant by means of a pressure-control valve. The pressures of individual hydraulic cylinders are then regulated using further pressure-control valves. It is known to couple the pumps to the internal combustion engine in the manner of an ancillary drive.

It is however also known to connect the pressure port of a pump directly to a hydraulic cylinder and drive the pump by means of an electric motor. In this case, it is also possible to regulate the pressure in the hydraulic cylinder by adjusting the rotation speed of the electric motor.

SUMMARY

In this context, it is an object of the invention to specify an improved actuator arrangement for a motor vehicle drive train, which in particular is economic and can be implemented with few components.

This object is achieved with the actuator arrangement of the type cited initially, in that the shift actuator device has a shift drum which is or can be coupled to the electric motor via a shift drum coupling device, so that the shift drum can be set in rotation by means of the electric motor in order to actuate the shift clutch arrangement.

The present invention therefore assumes in principle that a friction clutch of an automated motor vehicle drive train is actuated hydraulically, wherein the associated hydraulic circuit has a pump driven by an electric motor. Via the shift drum coupling device, it is possible to use the same electric motor also to rotate a shift drum which serves to actuate the shift clutch arrangement.

When a shift drum is used to actuate the shift clutch arrangement, it is advantageous that only a single drive is necessary to engage and disengage gears or several shift clutches. In other words, a shift drum can actuate several shift clutch packets (in particular synchronization mechanisms), to which end the shift drum preferably comprises several shift drum grooves. In an automated manual gear mechanism for example, the shift drum can be used to actuate all shift clutch packets of the gear mechanism. It is however also possible as an alternative to provide several shift drums, each of which actuates a part quantity of the shift clutch packets. In the latter case, it is possible for the shift drum coupling device to couple the electric motor to different shift drums alternatively. It is however particularly preferred if each shift drum is assigned its own electric motor. Therefore it is also possible that a separate electric motor, which is not used for pump drive, is provided for a further shift drum.

When using an automated manual gear mechanism, which usually only has a single friction clutch in the form of a starting clutch, it is possible for example to connect the electric motor to a pump which generates a line pressure secured via a pressure accumulator to actuate the friction clutch. Alternatively it is also possible to connect the electric motor to a pump, the pressure port of which is directly connected to a clutch hydraulic cylinder. Then via the shift drum coupling device, one shift drum or where applicable a plurality of shift drums can be coupled to this electric motor. If only one shift drum can be coupled, a further shift drum can be controlled where necessary via a separate electric motor.

Particular advantages however result in motor vehicle drive trains which have a double clutch gear mechanism. Here two friction clutches are present, each of which preferably has its own pump with its own electric motor. In this case, a shift drum can be assigned to each of the two electric motors via a shift drum coupling device. Here it is preferred if one shift drum engages and disengages the gears of one part gear mechanism, and the other shift drum engages and disengages the gears of the other part gear mechanism. In this case it is advantageous if, in each case, the shift drum which can be actuated by means of the assigned electric motor is the drum which is assigned to the clutch actuation of the inactive part gear mechanism. Alternatively it is however also conceivable to distribute the gears in a different manner over two (or more) shift drums.

As a whole, with the present invention a multiple usage of electric motors can be achieved, since one electric motor can be used both for pump drive and for shift drum drive. Consequently, the actuator arrangement can be implemented with few components, in particular few electric motors and few electric pumps.

The electric motor can be positioned favorably so that packaging advantages can be achieved. Furthermore, as a whole, weight and cost benefits are achieved because of the low number of components to be used.

The object is therefore fully achieved.

According to a particularly preferred embodiment, the electric motor is rigidly coupled to a drive shaft of the pump.

With this measure, the construction of the actuator arrangement as a whole can be simplified. The shift drum coupling device can be coupled to the output shaft of the electric motor or the drive shaft of the pump at any arbitrary point.

It is of particular advantage here if the hydraulic circuit has a pressure-reduction valve which, in one valve position, connects at least one pressure port of the pump to a low-pressure portion.

The pressure-reduction valve can consequently be used to connect the pressure at a pressure port of the pump to the low-pressure port, in order in this way to avoid accidental actuation of the friction clutch during actuation of the shift drum. In other words, the pump can be activated to actuate the friction clutch when the shift drum coupling device has decoupled the shift drum from the electric motor. Conversely, when the shift drum coupling device is closed, the electric motor can drive the shift drum without simultaneously actuating the friction clutch or otherwise generating a working pressure on the side of the pump pressure port.

It is particularly preferred if the pressure-reduction valve in one valve position connects a pressure port directly to a low-pressure portion, wherein the low-pressure portion can be a tank. In a second valve position, the pressure-reduction valve can in contrast be closed, so that the low-pressure portion is isolated from the high-pressure portion. The pressure-reduction valve can preferably be formed as a directional valve, preferably as a 2/2-port directional valve. The directional valve can be actuated electrically or hydraulically.

According to a further preferred embodiment, the electric motor is coupled to a drive shaft of the pump via a pump coupling device.

In this embodiment, an output shaft of the electric motor can consequently be coupled to or decoupled from the pump drive shaft via the pump coupling device, and preferably, furthermore, the output shaft of the electric motor can be coupled to or decoupled from the shift drum via the shift drum coupling device.

In this embodiment, it is possible to configure the shift drum coupling device and pump coupling device such that these are coupled only alternatively to the output shaft of the electric motor. In this case it may not be necessary to provide a pressure-reduction valve in the hydraulic circuit, which in one valve position connects at least one pressure port of the pump to a low-pressure portion.

Here it is a particular advantage if the shift drum coupling device and the pump coupling device are integrated in one coupling device packet.

Such a coupling device packet can be constructed similarly to a shift clutch packet of a manual gear mechanism, i.e. for example have a shift sleeve which can be connected to a clutch body of the shift drum coupling device or to a clutch body of the pump coupling device. The coupling device packet can be formed in the manner of two shift clutches which are configured as synchronized shift clutches. Preferably however these clutches are configured as non-synchronized clutches, in particular as claw clutches.

As a whole it is furthermore preferred if the shift drum coupling device and/or a pump coupling device can be actuated by means of an electrically controllable coupling device actuator.

Here it is possible to actuate the shift drum coupling device and/or a pump coupling device via an overlying electric or electronic control device.

According to an alternative embodiment, it is provided that the shift drum coupling device and/or a pump coupling device can be actuated by means of a hydraulic coupling device actuator.

Here in some cases components already present in the hydraulic circuit can be used, so as to save on components.

In general it is indeed possible to use the actuator arrangement according to the invention for example in automated manual gear mechanisms or also in convertor automatic gear mechanisms. Furthermore it is possible to use the actuator arrangement in hybrid drive trains, or also in purely electric drives in which a friction clutch and a gear mechanism with at least two gears are present.

It is particularly preferred however if the motor vehicle drive train comprises a double clutch gear mechanism with a first friction clutch and a second friction clutch, wherein the hydraulic circuit has a first pump which can be driven by a first electric motor for the first friction clutch, and a second pump which can be driven by a second electric motor for the second friction clutch, wherein the shift actuator device has a first shift drum and a second shift drum, wherein the first shift drum can be coupled to the first electric motor via a first shift drum coupling device and wherein the second shift drum can be coupled to the second electric motor via a second shift drum coupling device.

In this embodiment it is particularly advantageous if one of the two electric motors can be used for example to drive the associated pump so that the associated friction clutch is closed, in order to transmit power via the associated power transmission train of the double clutch gear mechanism. In this case the other electric motor can be connected to the assigned shift drum via the associated shift drum coupling device, in order for example to engage and disengage gears in an inactive part gear mechanism of the double clutch gear mechanism.

In this embodiment, it is preferred if the hydraulic circuit has a cross-circuit portion which can connect at least one port of the second pump to a hydraulic first coupling device actuator to actuate the first shift drum coupling device, and/or which can connect at least one port of the first pump to a hydraulic second coupling device actuator to actuate the second shift drum coupling device.

In this embodiment, the pressure generated via the pump assigned to the active power transmission branch of the double clutch gear mechanism can be used to actuate the hydraulic coupling device actuator assigned to the inactive power transmission path.

In the simplest case, a pressure port of a pump can be connected to the hydraulic coupling device actuator which is assigned to the other power transmission path.

Here it is preferred if the coupling device actuator has a spring, by means of which the assigned shift drum coupling device is pressed into an open state. The spring constant of this spring can preferably be designed so that it is deflected only under a high force from the coupling device actuator. This force can correspond to a pressure at the pressure port of the pump of the other (active) power transmission path, which is so high that the friction clutch is over-pressured, i.e. corresponding to a pressure which exceeds the closing pressure of the friction clutch. In this way it can be guaranteed that the coupling device actuator is activated only if a specific high pressure is set, which for example can be predefined by an electric control device.

Alternatively or additionally, it is possible for the hydraulic coupling device actuator to be connected to a suction port of a pump (preferably to the suction port of the pump of the other power transmission path), such that the coupling device actuator is supplied with fluid when the pump reverses its direction of rotation.

In this variant, in a double clutch gear mechanism, the hydraulic coupling device actuator assigned to the inactive power transmission path is then also actuated by means of the pump of the active power transmission path, if the friction clutch of the active power transmission path is not closed.

In other words, in this embodiment it is possible to be able to engage gears if neither of the two power transmission paths is active, i.e. for example when the double clutch gear mechanism is in a neutral position.

As a whole, it is furthermore preferred if the shift drum coupling device has at least one transmission ratio stage.

Firstly, this allows the electric motor to be arranged physically separately from the assigned shift drum. Furthermore, the electric motor can be coupled to the shift drum via a suitable transmission ratio.

The shift drum coupling device is preferably arranged concentrically to an output shaft of the electric motor and/or to a drive shaft of the assigned pump.

Alternatively however, it is also possible for the shift drum coupling device to be integrated in the shift drum.

Correspondingly, it is also possible for the electric motor to be arranged coaxially to a drive shaft of the pump. Alternatively it is also possible for the electric motor to be arranged coaxially to the assigned shift drum and be connected to a drive shaft of the pump via a translation stage. The pump of the hydraulic circuit can here be driven by means of the electric motor so that it generates a line pressure, from which then a suitable pressure for actuating the friction clutch can be derived or regulated by pressure control valves.

It is however particularly preferred if the pump has a pressure port which is directly connected to the clutch hydraulic cylinder.

In this case, the pressure in the clutch hydraulic cylinder is set by a volume flow of the pump, which in turn is set via the rotation speed of the electric motor.

In this embodiment it is advantageous that no costly proportional valves are necessary to actuate the friction clutch. This is not only advantageous for cost reasons, but it also simplifies installation since the other components of the hydraulic circuit also preferably do not require any proportional valves, installation of which generally imposes high requirements on cleanliness.

Furthermore, the above object is also achieved by a motor vehicle drive train with an actuator arrangement according to the invention, wherein the motor vehicle drive train preferably has a double clutch gear mechanism of the type described above.

It is evident that the features listed above and to be explained in more detail below can be used not only in the combinations given, but also in other combinations or alone without leaving the context of the present invention.

BRIEF DESCRIPTION OF THE DRAWINGS

Exemplary embodiments of the invention are shown in the drawing and described in more detail in the description below. The drawings show:

FIG. 3 a diagrammatic view of a further embodiment of an actuator arrangement according to the invention;

FIG. 4 a diagrammatic view of a further embodiment of an actuator arrangement according to the invention; and FIG. 5 a diagrammatic depiction of a shift drum with an integrated shift drum coupling device.

DESCRIPTION OF PREFERRED EMBODIMENTS

Figure 1:
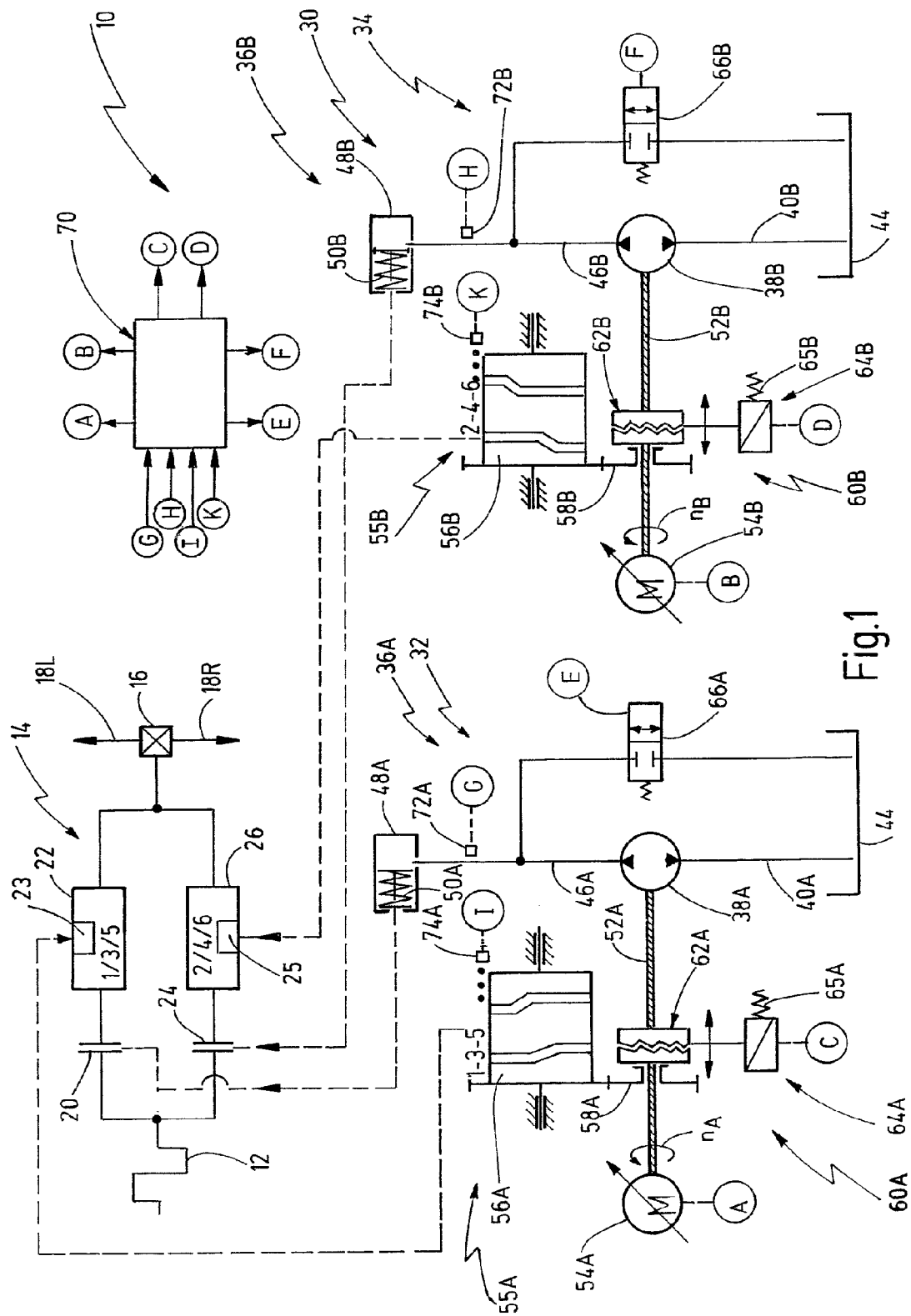
FIG. 1 a diagrammatic depiction of a first embodiment of a motor vehicle drive train with a first embodiment of an actuator arrangement according to the invention.

FIG. 1 shows diagrammatically a motor vehicle drive train generally designated 10.

The drive train 10 has a drive motor 12 which can for example be configured as an internal combustion engine. The motor vehicle drive train 10 furthermore comprises a double clutch gear mechanism 14, the input of which is connected to the drive motor 12 and the output of which is connected to a differential 16. The differential 16 distributes the drive power to two drive shafts 18L, 18R of the motor vehicle.

The double clutch gear mechanism 14 has two parallel power transmission trains. The first power transmission train contains a first friction clutch 20 and a first part gear mechanism 22. The first part gear mechanism 22 serves to position the odd-numbered forward gears 1, 3, 5 etc. and contains a shift clutch arrangement 23, by means of which these gears can be engaged and disengaged. The second power transmission train contains a second friction clutch 24 and a second part gear mechanism 26 assigned to the even-numbered gears 2, 4, 6 etc. The gears of the second part gear mechanism 26 can be engaged and disengaged by means of a shift clutch arrangement 25. The shift clutch arrangements 23, 25 can have synchronization devices which can be actuated for example by means of shift sleeves. The first friction clutch 20 and the second friction clutch 24 can each be configured as wet-running plate clutches, but can also be formed as dry friction clutches.

For automatic actuation of the friction clutches 20, 24 and the shift clutch arrangements 23, 25, an actuator arrangement 30 is provided. The actuator arrangement 30 contains a first actuator portion 32 associated with the first power transmission train, and a second actuator portion 34 associated with the second power transmission train.

The two actuator portions 32, 34 are substantially identical in construction, so that below only the first actuator portion 32 will be described. Its elements carry the suffix "A", whereas the corresponding elements of the second actuator portion 34 carry the suffix "B".

The hydraulic circuit 36A has a pump 38A. A suction port 40A of the pump 38A is connected to a low-pressure portion in the form of a tank 44.

A pressure port 46A is directly connected to a clutch hydraulic cylinder 48A. The clutch hydraulic cylinder 48A serves to actuate the first friction clutch 20 and has a spring

50A, by means of which the clutch hydraulic cylinder 48A is brought into a position in which the first friction clutch 20 is open.

The pump 38A has a drive shaft 52A which is rigidly connected to an output shaft of an electric motor 54A, not shown in more detail. The electric motor 54A is configured adjustably with regard to its position and/or rotation speed, and provides a rotation speed $n_A$ at its motor output shaft.

To close the first friction clutch 20, the electric motor 54A is set in rotation such that through suction port 40A, the pump 38A draws in a volume flow from the low-pressure portion 44 and provides this at the pressure port 46A. This increases the pressure in the clutch hydraulic cylinder 48 so that this is deflected against the force of the spring 50A in order to close the friction clutch 20. The amount of pressure exerted by the clutch hydraulic cylinder 48A on the first friction clutch 20 and/or the extent of the clutch travel can be adjusted, in particular regulated, by adjusting the rotation speed $n_A$.

To open the first friction clutch 20, either the rotation speed $n_A$ is reduced or its direction reversed so that the clutch hydraulic cylinder 48A is evacuated. Evidently to achieve this, in some cases the pressure port 46A must be connected via a valve to the low-pressure portion 44, but this will be described in more detail below.

The second friction clutch 24 is actuated accordingly via the second actuator portion 34.

To actuate the shift clutch arrangement 23 of the first part gear mechanism 22, the first actuator portion 32 has a shift actuator device 55A. The shift actuator device 55A has a shift drum 56A. The shift drum 56A can contain one or more control grooves (in FIG. 1, advantageously two control grooves are depicted for actuating two shift clutch packets, i.e. four gears).

Each of the control grooves is preferably coupled to a shift sleeve of a shift clutch packet of the shift clutch arrangement 23.

The shift drum 56A is mounted rotatably about an axis (not shown in detail) and coupled to a shift drum coupling device 60A via a transmission ratio stage 58A. The shift drum coupling device 60A has a member which is connected rotationally fixedly to the output shaft of the electric motor 54A, and a member which is mounted freely rotatable in relation to the drive shaft of the electric motor 54A. The two members of the shift drum coupling device 60A are either separated, in which case the shift drum 56A is decoupled from the output shaft of the electric motor 54A. When the shift drum coupling device 60A is in the closed state, the output shaft of the electric motor 54A is coupled to the shift drum 56A via the translation stage 58A, so that the shift drum 56A can be set in rotation by the electric motor 54A in order to actuate the shift clutch arrangement 23.

In the present case, the shift drum coupling device 60A is formed by a face gear clutch 62A. The shift drum coupling device 60A can however also be formed by a claw clutch, by a magnetic powder clutch etc.

In the present case an electric coupling device actuator 64A is provided to actuate the shift drum coupling device 60A. This can for example contain an electro-magnet, by means of which the shift drum coupling device 60A is open or closed. Preferably the electric coupling device actuator 64A contains a pretension spring 65A, by means of which the shift drum coupling device 60A is pretensioned in an open position.

In the present case, the output shaft of the electric motor 54A is rigidly connected to the drive shaft 52A of the pump 38A. When therefore the shift drum coupling device 60A is closed in order to set the shift drum 56A in rotation, the pump 38A is also driven. To avoid this accidentally actuating the assigned first friction clutch 20, a pressure-reduction valve 66A is provided in the hydraulic circuit 36A. The pressure-reduction valve 66A connects the pressure port 46A of the pump 38A to the low-pressure portion 44. In the first position shown in FIG. 1, the pressure port 46A is isolated from the low-pressure portion 44. Via an electromagnetic actuation, the pressure-reduction valve 66A can be moved into a second valve position in which the pressure port 46A is connected to the low-pressure portion 44.

The pressure-reduction valve 66A is preferably brought into this position when the shift drum coupling device 60A is closed. When, in this case, the shift drum 56A is driven by means of the electric motor 54A, the pump 38A delivers a volume flow via the suction port 40A to the pressure port 46A and from there via the pressure-reduction valve 66A to the low-pressure portion 44. When the shift drum 56A rotates in the opposite direction, the pump delivers back to the low-pressure portion 44 via the pressure port 56A and suction port 40A. Consequently, accidental actuation of the first friction clutch 20 during the shift drum actuation can be prevented. Furthermore, to support a rapid evacuation of the clutch hydraulic cylinder 48A, the pressure-reduction valve 66A can connect the pressure port 46A to the low-pressure portion 44.

To control the actuator arrangement 30, a control device 70 is provided. The control device 70 serves firstly to control the electric motors 54A, 54B, wherein corresponding power electronics may be provided for both motors together or for each electric motor separately. Furthermore the control device 70 is connected to the electric coupling device actuators 64A, 64B in order to open or close the shift drum coupling devices 60A, 60B. Furthermore the control device 70 is connected to the pressure-reduction valves 66A, 66B in order to bring these into one valve position or the other. Finally, the control device 70 is connected to a series of sensors, preferably including pressure sensors 72A, 72B which measure the respective pressures in the pressure ports 46A, 46B or the clutch hydraulic cylinders 48A, 48B. Also the control device 70 is preferably connected to rotary angle sensors 74A, 74B which detect the rotation angle of the shift drums 56A, 56B.

In drive mode, power is transmitted via one of the two power transmission paths or trains. This train is then the active train. In this case the associated friction clutch is closed. During this phase, the shift drum coupling device 60 assigned to this active power transmission path is preferably open. If for example power is transmitted via the first power transmission train, the pump 38A is set in rotation in order to generate and supply a volume flow which produces a corresponding closing pressure in the clutch hydraulic cylinder 48A. The first shift drum coupling device 60A is open. During this phase, a gear can be pre-selected in the part gear mechanism of the inactive path, i.e. in the above example, in the second part gear mechanism 26. For this the pressure-reduction valve 66B is brought into the second valve position in which the pressure port 46B is connected to the low-pressure portion 44. Furthermore, the second shift drum coupling device 60B is closed. Now by turning the second electric motor 54B, a gear can be pre-selected in the inactive part gear mechanism 26.

In double clutch gear mechanisms, a transfer takes place from one power transmission path to the second power transmission path by overlapping actuation of the two friction clutches. During this phase, the shift drum coupling devices 60A, 60B are preferably each open and the pressure-reduction valves 66A, 66B are preferably in the first position, in which the respective pressure ports are isolated from the low-pressure portion.

Figure 2:
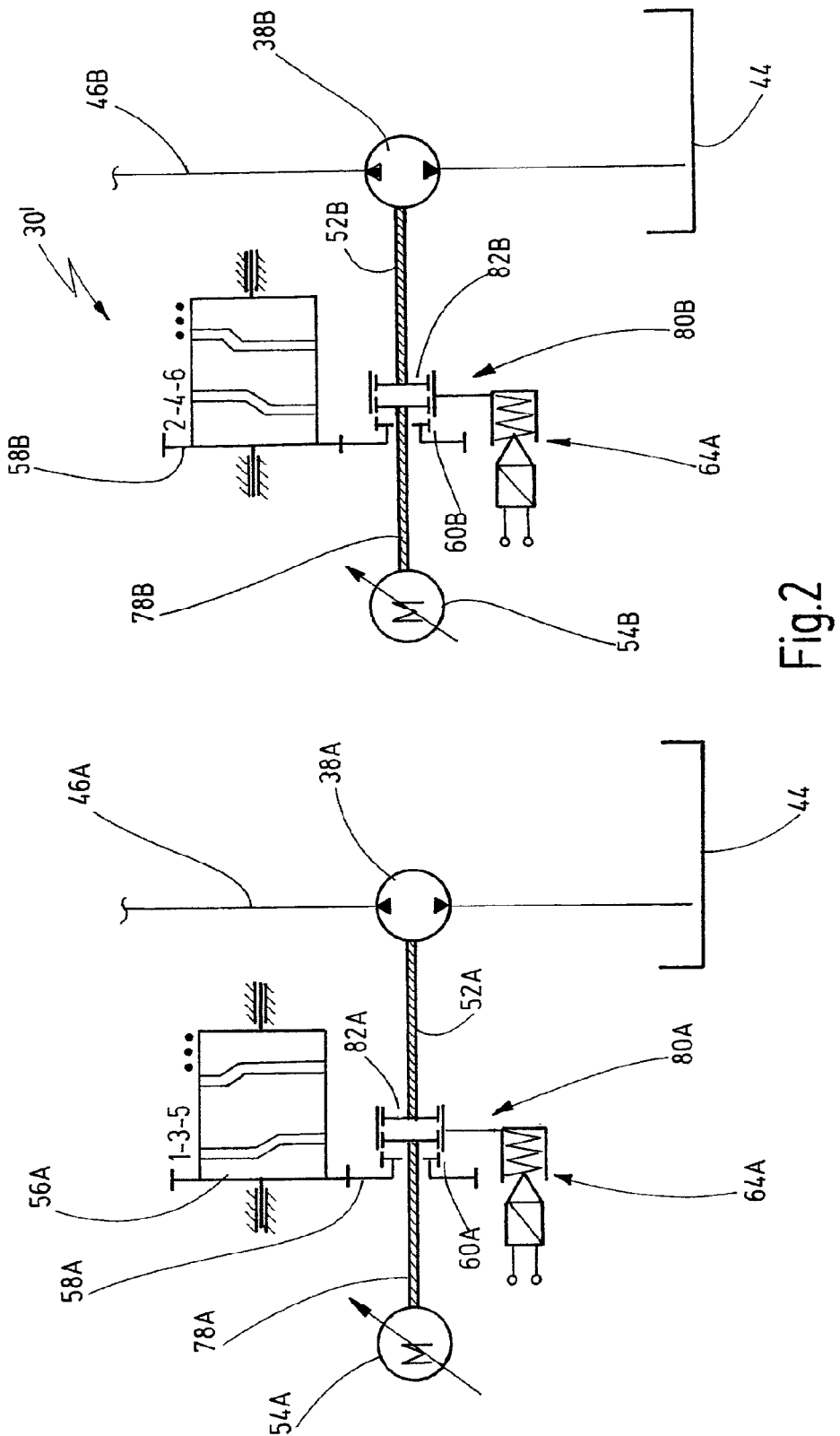
FIG. 2 a diagrammatic view of a further embodiment of an actuator arrangement according to the invention.

In the following FIGS. 2 to 4, alternative embodiments of hydraulic circuits are explained which generally correspond with regard to construction and function to the hydraulic circuit 36 of FIG. 1. The same elements are therefore marked with the same reference numerals. The description below substantially describes the differences. FIG. 2 shows an actuator arrangement 30' in which an output shaft 78A of the electric motor 54A is not rigidly coupled to the drive shaft 52A of the pump 38A. Rather the output shaft 78A can be coupled to the drive shaft 52A or separated therefrom via a pump coupling device 82A. The pump coupling device 82A can—as shown—be integrated with the shift drum coupling device 60A in a coupling device packet 80A. The same applies to the second actuator portion.

The coupling device packet 80A can be configured such that either the shift drum coupling device 60A or the pump coupling device 82A is closed, such that the output shaft 78A of the electric motor 54A is coupled to the shift drum 56A or to the drive shaft 52A of the pump 38A. The coupling device packet 80A can be constructed in the manner of a shift clutch packet as used in part gear mechanisms 22, 26.

In this embodiment, it is not necessary to be able to connect the pressure port of pump 38A to the low-pressure portion 44 via the pressure-reduction valve 66A. Rather the actuator arrangement 30' can be implemented without such pressure-reduction valves 66.

Whereas the coupling devices 60 and 60, 82 are actuated preferably electromagnetically in the embodiments in FIGS. 1 and 2, in the following FIGS. 3 and 4 embodiments are explained in which these coupling devices are actuated hydraulically. In these embodiments, no complex electromagnetic actuators are required. The general function of the actuator arrangement 30'' shown in FIG. 3 corresponds to that of the actuator arrangement 30' in FIG. 2, and the function of the actuator arrangement 30''' in FIG. 4 corresponds to that of the actuator arrangement 30 in FIG. 1.

In the embodiments 30'', 30''' of FIGS. 3 and 4, instead of the electric coupling device actuators 64A, 64B, hydraulic coupling device actuators 86A, 86B are provided. These each have a spring 88A by means of which the hydraulic coupling device actuators 86A, 86B are pretensioned in one position. In the embodiment in FIG. 3, a coupling device packet 80A is provided corresponding to that of FIG. 2, and the spring 88A pretensions the associated coupling device actuator 86A in the position in which the electric motor 54A is connected to the drive shaft of the pump 38, i.e. in the position in which the pump coupling device 82A is closed and the shift drum coupling device 60A is open. The hydraulic circuits 36A, 36B of the actuator arrangement 30'' in FIG. 3 have a common cross-circuit portion 90. This contains a first connecting line 92A which connects a hydraulic cylinder of the hydraulic coupling device actuator 86A to a port of the pump 38B. This can be the pressure port or the suction port. In the present case, the pressure port and the suction port of the second pump 38B are connected together via a change-over valve 94B, and the connection line 92A connects the change-over valve 94B to the coupling device actuator 86A. Correspondingly, the second hydraulic coupling device actuator 86B for the second coupling device packet 80B is connected via a connecting line 92B of the cross-circuit section 90 to a port of the first pump 38A, either to the pressure port or to the suction port. In the present case, the second connecting line 92B is connected to a corresponding change-over valve 94A which connects together the suction port and the pressure port of the first pump 38A.

Consequently, the coupling device packet 80A can for example be brought into the position in which the pump coupling device 82A is open and the shift drum coupling device 60A is closed, in that the second pump 38B is operated in the reverse direction of rotation so that fluid is drawn in via the pressure port 46B and conducted to the first connecting line 92A via the suction port and change-over valve 94B. This alternative actuation method is selected when the second friction clutch 24 is open. If however the second friction clutch 24 is closed, the pressure in the pressure port of the second pump 38B is greater than that in the associated suction port, so that the change-over valve 94B switches over. In this case, the pressure port 46B of the second pump 38B is connected to the first coupling device actuator 86A via the first connecting line 92A. To prevent an accidental activation of the coupling device actuator 86A, the return spring 88A is designed such that it is not deflected on a normal closure of the second friction clutch 24 and a corresponding pressure in the second pressure port 46B, i.e. the first coupling device actuator 86A is not activated. However the pressure in the pressure port 46B can be increased by increasing the rotation speed of the second electric motor 54B so that the second friction clutch is over-pressured. The pressure thus established is sufficient to deflect the first coupling device actuator 86A against the force of the spring 88A, and consequently to open the first pump coupling device 82A and close the first shift drum coupling device 60A, so that from this moment the shift drum 56A can be turned by means of the electric motor 54A. Accordingly, the second shift drum 56B can be actuated when the first pump 38A is operated in the opposite direction of rotation or a pressure is generated at the first pressure port 46A which over-pressures the first friction clutch 20 and deflects the second coupling device actuator 86B against the force of the spring 88B.

FIG. 4 shows a further embodiment of an actuator arrangement 30''' which with regard to structure and function generally corresponds to the actuator arrangement 30'' of FIG. 3. The same elements therefore carry the same reference numerals. Substantially the differences are explained below.

In the actuator arrangement 30''', as in the actuator arrangement 30 in FIG. 1, no pump coupling device 82 is provided but an output shaft of the electric motor 54A is rigidly connected to a drive shaft of the associated pump 38A. The same applies to the second actuator portion. Consequently a pressure-reduction valve 66' is provided between the pressure ports and the suction ports of the pumps 38. The pressure-reduction valves 66A', 66B' of the actuator arrangement 30''' of FIG. 4 are however actuated not electromagnetically but hydraulically. For this, the first pressure-reduction valve 66A' is connected to the first connecting line 92A and the second pressure-reduction valve 66B' is connected to the second connecting line 92B. Consequently the shift drum coupling devices 60A, 60B are each closed in synchrony with the movement of the pressure-reduction valves 66A', 66B' into the respective switch position in which the ports of the pumps are connected to the low-pressure portion.

Finally, FIG. 5 shows an alternative embodiment of a shift drum 56A' in which a shift drum coupling device 60A' is integrated coaxially and can be connected directly or via an translation stage 58A to the output shaft 78A of the electric motor. The shift drum coupling device 60A' integrated in the shift drum 56A' can be constructed in principle as explained above in relation to FIG. 1 or FIG. 4. Optionally, a pump coupling device 82 can be arranged between the output shaft 78A of the electric motor and the drive shaft of the associated pump, but this is not however shown in FIG. 5.

What is claimed is:

1. An actuator arrangement for a motor vehicle drive train which comprises at least one friction clutch for transmission of drive torque and a gear mechanism with at least two gears which can be engaged and disengaged by means of a shift clutch arrangement, with a hydraulic circuit having a pump which can be driven by means of an electric motor and having a clutch hydraulic cylinder, by means of which the friction clutch can be actuated, and with a shift actuator device for activating the shift clutch arrangement, wherein the shift actuator device has a shift drum which is coupled or can be coupled to the electric motor via a shift drum coupling device, so that the shift drum can be set in rotation by means of the electric motor in order to actuate the shift clutch arrangement, wherein the pump has a pressure port which is directly connected to the clutch hydraulic cylinder so that it is possible to regulate the pressure in the hydraulic cylinder by adjusting the rotation speed of the electric motor.

2. The actuator arrangement as claimed in claim 1, wherein the electric motor is rigidly coupled to a drive shaft of the pump.

3. The actuator arrangement as claimed in claim 2, wherein the hydraulic circuit has a pressure-reduction valve which, in one valve position, connects at least one pressure port of the pump to a low-pressure portion.

4. The actuator arrangement as claimed in claim 1, wherein the electric motor is coupled to a drive shaft of the pump via a pump coupling device.

5. The actuator arrangement as claimed in claim 4, wherein the shift drum coupling device and the pump coupling device are integrated in a coupling device packet.

6. The actuator arrangement as claimed in claim 1, wherein at least one of the shift drum coupling device and a pump coupling device can be actuated by means of an electrically controllable coupling device actuator.

7. The actuator arrangement as claimed in claim 1, wherein at least one of the shift drum coupling device and a pump coupling device can be actuated by means of a hydraulic coupling device actuator.

8. The actuator arrangement as claimed in claim 1, wherein the motor vehicle drive train has a double clutch gear mechanism with a first friction clutch and with a second friction clutch, wherein the hydraulic circuit has a first pump which can be driven by a first electric motor for the first friction clutch, and a second pump which can be driven by a second electric motor for the second friction clutch, wherein the shift actuator device has a first shift drum and a second shift drum, wherein the first shift drum can be coupled to the first electric motor via a first shift drum coupling device, and wherein the second shift drum can be coupled to the second electric motor via a second shift drum coupling device.

9. The actuator arrangement as claimed in claim 8, wherein the hydraulic circuit has a cross-circuit portion which at least one of can connect at least one port of the second pump to a hydraulic first coupling device actuator to actuate the first shift drum coupling device, and can connect at least one port of the first pump to a hydraulic second coupling device actuator to actuate the second shift drum coupling device.

10. The actuator arrangement as claimed in claim 7, wherein the hydraulic coupling device actuator is connected to a suction port of the pump such that the coupling device actuator is supplied with fluid when the pump reverses its direction of rotation.

11. The actuator arrangement as claimed in claim 1, wherein the shift drum coupling device has at least one transmission ratio stage.

12. The actuator arrangement as claimed in claim 1, wherein the shift drum coupling device is integrated in the shift drum.

13. An actuator arrangement for a motor vehicle drive train which comprises a double clutch gear mechanism for transmission of drive torque with a first friction clutch and with a second friction clutch, and a gear mechanism with at least two gears which can be engaged and disengaged by means of a shift clutch arrangement, wherein the actuator arrangement comprises a hydraulic circuit having a first pump which can be driven by a first electric motor for the first friction clutch, having a second pump which can be driven by a second electric motor for the second friction clutch, having a first clutch hydraulic cylinder, by means of which the first friction clutch can be actuated, and having a second clutch hydraulic cylinder, by means of which the second friction clutch can be actuated, and a shift actuator device for activating the shift clutch arrangement, wherein the shift actuator device has a first shift drum and a second shift drum, wherein the first shift drum can be coupled to the first electric motor via a first shift drum coupling device, and wherein the second shift drum can be coupled to the second electric motor via a second shift drum coupling device, wherein the hydraulic circuit further has a cross-circuit portion which at least one of (i) can connect at least one port of the second pump to a hydraulic first coupling device actuator to actuate the first shift drum coupling device, and (ii) can connect at least one port of the first pump to a hydraulic second coupling device actuator to actuate the second shift drum coupling device.

14. The actuator arrangement as claimed in claim 13, wherein at least one of the first and the second shift drum coupling device has at least one transmission ratio stage.

15. The actuator arrangement as claimed in claim 13, wherein at least one of the first and the second shift drum coupling device is integrated in the shift drum.

16. The actuator arrangement as claimed in claim 13, wherein the cross-circuit portion comprises a first change-over valve that connects a pressure terminal and a suction terminal of the first pump, and a second change-over valve that connects a pressure terminal and a suction terminal of the second pump.

17. The actuator arrangement as claimed in claim 16, wherein the change-over valves connect the respective pressure terminal or suction terminal with a respective connection line that is connected to a respective coupling device actuator.

18. The actuator arrangement as claimed in claim 17, wherein the connection lines are each connected with a pressure-reduction valve that connects the pressure terminal and the suction terminal of a pump which is associated to the respective coupling device actuator, wherein the pressure-reduction valve, in one valve position, connects the pressure port and the suction port of the pump to a low-pressure portion.

19. An actuator arrangement for a motor vehicle drive train which comprises at least one friction clutch for transmission of drive torque and a gear mechanism with at least two gears which can be engaged and disengaged by means of a shift clutch arrangement, with a hydraulic circuit having a pump which can be driven by means of an electric motor and having a clutch hydraulic cylinder, by means of which the friction clutch can be actuated, and with a shift actuator device for activating the shift clutch arrangement, wherein the pump has a pressure port which is directly connected to the clutch hydraulic cylinder so that it is possible to regulate the pressure in the hydraulic cylinder by adjusting the rotation speed of the electric motor, and wherein the shift actuator device has a shift drum which is coupled or can be coupled to the electric motor via a shift drum coupling device, so that the shift drum can be set in rotation by means of the electric motor in order to actuate the shift clutch arrangement, wherein the shift drum coupling device has at least one transmission ratio stage.

* * * * *